United States Patent [19]

D'Amico et al.

[11] Patent Number: 4,796,176
[45] Date of Patent: Jan. 3, 1989

[54] INTERRUPT HANDLING IN A MULTIPROCESSOR COMPUTING SYSTEM

[75] Inventors: Lynn W. D'Amico, Hopkinton; James M. Guyer, Northboro, both of Mass.

[73] Assignee: Data General Corporation, Westboro, Mass.

[21] Appl. No.: 798,561

[22] Filed: Nov. 15, 1985

[51] Int. Cl.⁴ ............................................. G06F 13/00
[52] U.S. Cl. ............................................ 364/200
[58] Field of Search .......................... 340/825.51; 364/200 MS File, 900 MS File

[56] References Cited

U.S. PATENT DOCUMENTS

| | | | |
|---|---|---|---|
| 4,423,384 | 12/1983 | DeBock | 328/152 |
| 4,488,217 | 12/1984 | Binder et al. | 364/200 |
| 4,513,284 | 4/1985 | Right | 340/825.51 |
| 4,542,455 | 9/1985 | Demeure | 364/200 |
| 4,577,273 | 3/1986 | Hopper et al. | 364/200 |
| 4,611,297 | 9/1986 | Dudley et al. | 364/900 |
| 4,628,447 | 12/1986 | Cartret et al. | 364/200 |
| 4,633,394 | 12/1986 | Georgiou et al. | 364/200 |

Primary Examiner—Gareth D. Shaw
Assistant Examiner—Maria Napiorkowski
Attorney, Agent, or Firm—Robert M. Asher

[57] ABSTRACT

A multiprocessor computing system is disclosed which includes a system bus, a plurality of processing units and a plurality of synchronous input/output channel controllers. A plurality of priority lines each corresponding to a processing unit are provided through each input/output channel controller in order of priority. A synchronizing signal is generated at the same time in each input/output channel controller in response to the end of an address phase on the system bus. A latch is provided in the input/output controllers which responds to the synchronizing signal by storing the condition of the priority lines and whether an interrupt is pending. In response to a broadcast interrupt origin request instruction from a processing unit, all input/output channel controllers will respond at the same time but only the one with the priority interrupt for the requesting processing unit gives a non-zero response.

21 Claims, 4 Drawing Sheets

INTERRUPT HANDLING IN A MULTIPROCESSOR COMPUTING SYSTEM

BACKGROUND OF THE INVENTION

This invention relates to a method and apparatus for handling interrupts in a multiprocessor computing system, especially for a dual processor system. In particular, a control is provided so that a CPU can determine which input/output (I/O) channel has the highest priority interrupt pending for that particular processing unit.

In a multiprocessor computing system, it is desirable to have a plurality of I/O channels operating asyncronously. It is further desirable to allow any of the processing units to communicate with any of the I/O channels. The processors may then perform coequally rather than in a master-slave arrangement. Interrupts are used by the I/O channels to indicate to the processing unit that an I/O operation has been completed. Interrupts are also used for other conventional purposes such as to indicate a power failure. Interrupts are sporadically being caused in the I/O channels. The processing units handle the interrupts when they have time. A processing unit must first find out where the highest priority interrupt is pending. Hence, the processing unit polls the I/O channels to find out where the highest priority interrupt is pending. While the processing unit polls to determine where the highest priority interrupt is located, more interrupts are being issued. It is necessary for a system to deal with this problem which is further accentuated in an asynchronous system. Additionally, the longer it takes for the I/O channels to determine among themselves which has the highest priority interrupt, the more interrupts which will be produced in the interim and the slower the system will be in handling interrupts.

It is an object of the present invention to provide each I/O channel with instantaneous knowledge as to whether it holds the highest priority interrupt for a particular processing unit. It is a further object of the present invention to provide a system in which the I/O channels are flexibly reassignable to a different processing unit. It is a still further object of the present invention to provide synchronization when a processing unit polls the I/O channels to locate the highest priority pending interrupt so that there is one instant in time which is a reference for the entire system at which the priority status of interrupts is determined.

SUMMARY OF THE INVENTION

This invention is directed to a method and apparatus for handling interrupts in a multiprocessor computing system, particularly a dual processor system.

A multiprocessor computing system includes a plurality of processing units, a plurality of input/output (I/O) channels and memory. Interrupts from the I/O channels are handled by the present invention by providing a priority line corresponding to each processing unit. Each priority line is connected through each of the I/O channel controllers. The I/O channel controllers are arranged on the priority lines to normally assert priority over all lower priority I/O channel controllers. At each I/O channel controller, the priority line is gated so that an I/O channel relinquishes priority over all lower priority I/O channels when priority has not been asserted by a higher priority I/O channel and the I/O channel does not have an interrupt pending for the processing unit corresponding to the priority line. This advantageously provides each I/O controller with instantaneous knowledge of its priority so that an appropriate response can be made to an interrupt origin request.

The I/O channel controllers of the present invention each include a busy line which is asserted simultaneously when each controller receives an interrupt origin request. The busy line prevents any further interrupts from taking part in the response to the interrupt origin request, thus synchronizing all I/O channels to provide a consistent and orderly response to the request. The invention therefore advantageously provides synchronization of asynchronous controllers to handle interrupts in a multiprocessor system.

Other objects and advantages of the invention will become apparent during the following description of the presently preferred embodiment of the invention taken in conjunction with the drawings.

BRIEF DESCRIPTIONS OF THE DRAWINGS

DETAILED DESCRIPTION OF THE PREFERRED EMBODIMENT

Figure 1:
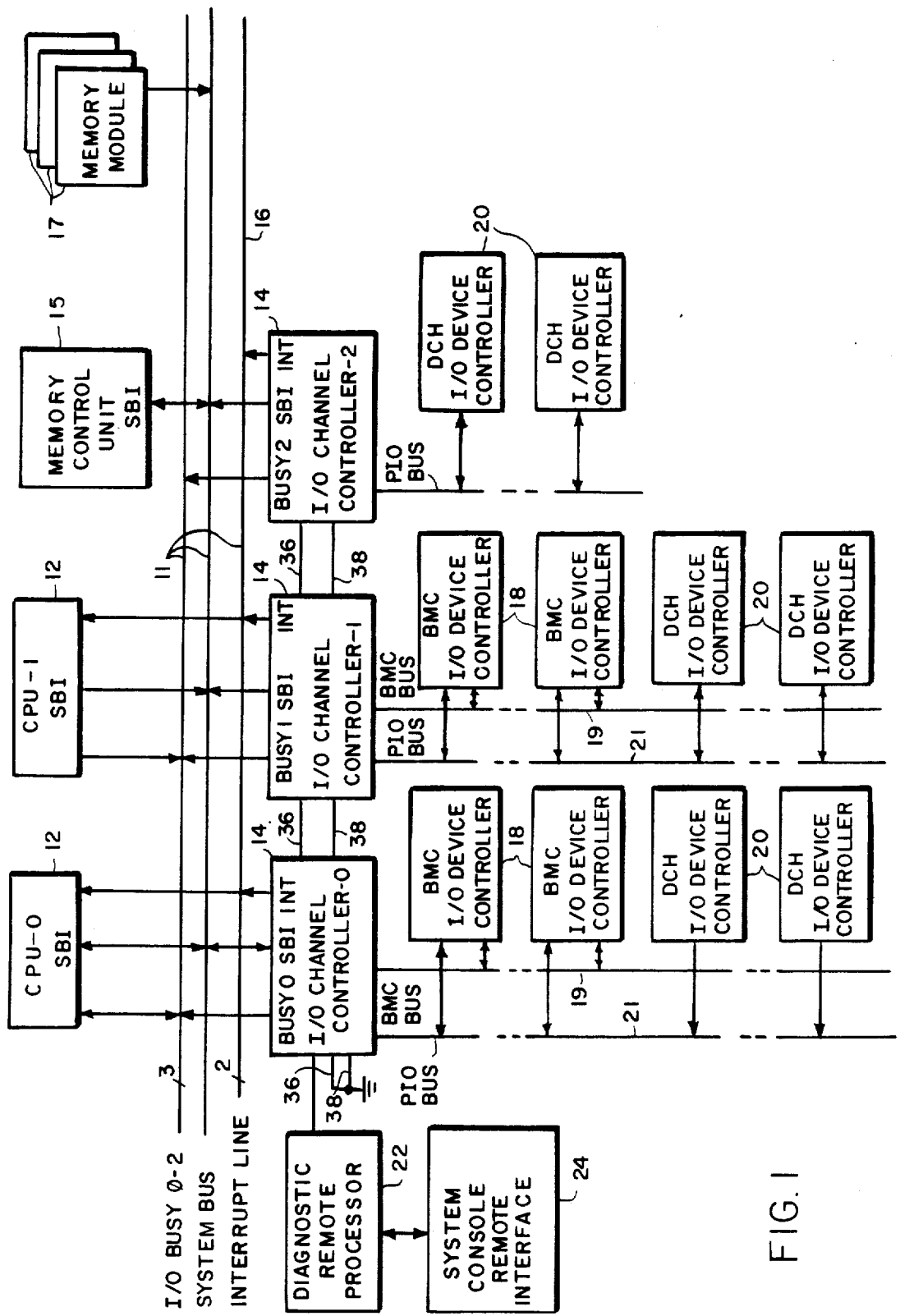
FIG. 1 is a schematic diagram of a multiprocessor computing system employing the interrupt handling apparatus of the present invention.

Turning now to the drawings, FIG. 1 is a simplified schematic representation of a multiprocessor computing system. The presently preferred embodiment includes two processing units 12 and three input/output (I/O) channel controllers 14. The computing system also includes a plurality of memory modules 17 and could include additional modules, such as a memory control unit (MCU) 15 and diagnostic remote processor 22, which are unrelated to the interrupt handling system of the present invention. The memory control unit 15 of the system shown in FIG. 1 monitors the use of the system bus 11 in reading and writing from and to memory. The MCU 15 detects and corrects errors in data from memory. The diagnostic remote processor (DRP) 22 interfaces with the system through the first I/O channel controller 14. The DRP 22 performs diagnostic routines and provides a communication path between the computing system and a system console remote interface 24.

Each of the processing units 12 is attached to one of two interrupt lines 16 which connect with each of the I/O channel controllers 14. The occurrence of an interrupt in an I/O channel is indicated to the appropriate processing unit through its one bit interrupt line. Each interrupt line acts as a wired OR so that an interrupt from one or more I/O channels will be indicated by the assertion of the line. The construction of a processing unit (CPU) 12 is well known. The CPU performs computations and manipulations of data in accordance with instructions. In a multiprocessor computing system, the plurality of processing units 12 give the system greater processing power and thus greater computing speed. The CPUs 12 in the system of the present invention are coequal acting asynchronously on instructions which are distributed among the CPUs. The CPUs 12 each have access to any of the I/O channels. Only one CPU can access an I/O channel at one time, however, if the CPUs are accessing a different I/O channel, the operations may be handled concurrently thereby reducing the system's total computation time.

An I/O channel controller 14 is connected with a plurality of input/output devices through their respective controllers. These may include burst multiplexor channel (BMC) I/O device controllers which are high speed I/O devices handling about 14 Megabytes per second. The BMC I/O device controllers are direct memory access devices. There may also be a number of data channel (DCH) I/O device controllers. These are asynchronous controllers that operate at about 2 Megabytes per second. The DCH I/O device controller is generally connected to slower operating I/O devices such as terminals or magnetic tapes or line printers. The I/O device controllers transfer memory directly between the memory modules and the I/O devices. The I/O device controllers cause an interrupt after completing a memory transfer. The CPU can instruct an I/O device controller to perform a transfer and then the CPU can go about its other business. The interrupt is issued to let the CPU know that the memory transfer operation has been completed.

The BMC I/O device controllers 18 are connected to the I/O channel controller 14 via a BMC bus 19 and a programmed I/O (PIO) bus 21. The DCH I/O device controllers 20 are connected only with the PIO bus 21 to access I/O channel controller 14. The PIO bus carries programmed I/O instructions. The PIO bus has 16 bits which carries both address and data. The PIO bus also carries interrupts for delivery to the interrupt line 16. The presently preferred PIO bus 21 is the NOVA/ECLIPSE $^R$ bus made by Data General Corporation of Westboro, Massachusetts. The BMC bus 19 has 37 bits which carry 21 bits of address and 16 bits of data.

As is known in the art, an operating system is the master software controlling the CPUs. The operating system assigns I/O channel controllers to one of the CPUs in the processing system. The assignment may be a simple arbitrary designation or a method of monitoring the loads on the CPUs and making assignments in an effort to more evenly balance the load between the processors. Thus, the assignments may be changed dynamically while the system is running. If the I/O channels are to be preassigned to CPUs, it is preferable to make the assignments in a manner which promotes the efficiency of the computing system. The writing of an operating system is well known in the art.

In accordance with the present invention, as shown in FIG. 1, a priority line corresponding to each of the processing units is connected through each of the I/O channels 14 for handling interrupts. Priority line 36 corresponds to the first processing unit (CPU0) and priority line 38 corresponds to the second processing unit (CPU1). The I/O channel controllers 14 are aligned on the priority lines 36 and 38 in order of their priority. Thus I/O channel controller 0 has a greater priority than I/O channel controller 1 and I/O channel controller 2. I/O channel controller 1 has priority over controller 2 but not over channel controller 0. I/O channel controller 2 has the lowest priority on the priority lines shown in the presently preferred embodiment.

When one of the I/O channel controllers asserts the priority line subsequent lower priority channels realize that a higher priority channel has taken priority. The lines into the I/O channel controller 0 are grounded so that channel 0 will never see an incoming priority asserted and thus may assert and take priority at any time.

The priority lines 36 and 38 are gated in each of the I/O channels. The gates form a priority chain through the I/O channels. The gates of the priority chain for one I/O channel are represented by OR gate 40 in FIG. 4. Each of the I/O channel controllers has the same gate 40 in the priority chain or a logical equivalent thereof. Gate 40 represents two OR gates, one for the lines corresponding to CPU 0 and the other for the lines corresponding to CPU 1. Since the logic is the same for the priority line corresponding to CPU 0 and that corresponding to CPU 1, one OR gate 40 is sufficient in the block diagram to represent the logic on both priority lines. Gate 40 receives the priority line from the next higher priority I/O channel controller. The highest priority I/O channel controller receives a grounded input. If any of the higher priority I/O channel controllers has asserted the priority line, that assertion will be passed through the priority chain to every one of the lower priority I/O channel controllers. The other input to OR gate 40 is a signal generated in the I/O control array 30 which indicates whether or not an interrupt is pending in the respective I/O channel for a particular CPU. If priority has not been asserted by a higher priority I/O channel and there are no interrupts pending in this particular I/O channel, the priority line will remain unasserted as it is output to the next lower I/O channel controller. The priority line will be asserted if either a higher priority I/O channel controller has asserted priority or an interrupt is pending for the particular CPU in this I/O channel.

It is an important aspect of the present invention that the determination of whether an interrupt is pending is synchronized for all I/O channel controllers despite that these controllers normally operate asynchronously. In accordance with the present invention, any time an instruction on the system bus is addressed to an I/O channel controller, that I/O channel controller will assert the signal IOBUSY corresponding to the I/O channel controller. IOBUSY is asserted at the beginning of the data phase on the system bus. One clock cycle after IOBUSY is asserted on the system control lines, an I/O control busy signal (CTRL IOBZ) is asserted in the control array of each of the I/O channels which was addressed by the instruction on the system bus. The I/O control busy signal is used to synchronize the determination of which I/O channel controller has priority, so that priority will be determined on a consistent basis throughout the system should the instruction over the system bus be a broadcast interrupt origin request from a CPU. In response to an interrupt origin request which is broadcast to all of the I/O channel controllers, the I/O channel controller with a pending interrupt for requesting CPU and the highest priority for that CPU will return a device code response. The device code indicates the type of interrupt pending which contains the highest priority of those pending in the I/O channel. Since interrupts may arrive while each of the I/O channels is executing the interrupt origin request to determine the device code it is going to return, it is critical that the CTRL IOBZ signal has synchronized the determination of priority so that the I/O channel controllers not having priority will ultimately know to ignore their device code and send zeroes in response to the interrupt origin request. The system address and data bus lines are open collector lines carrying inverted signals so that the bus lines act as a wired OR on the data and address signals. Thus, when all of the I/O channel controllers respond at the same time the device code returned by the highest priority I/O channel controller having an interrupt pending for the requesting CPU will not be affected by the zeroes driven by the other I/O channel controllers.

Figure 2:
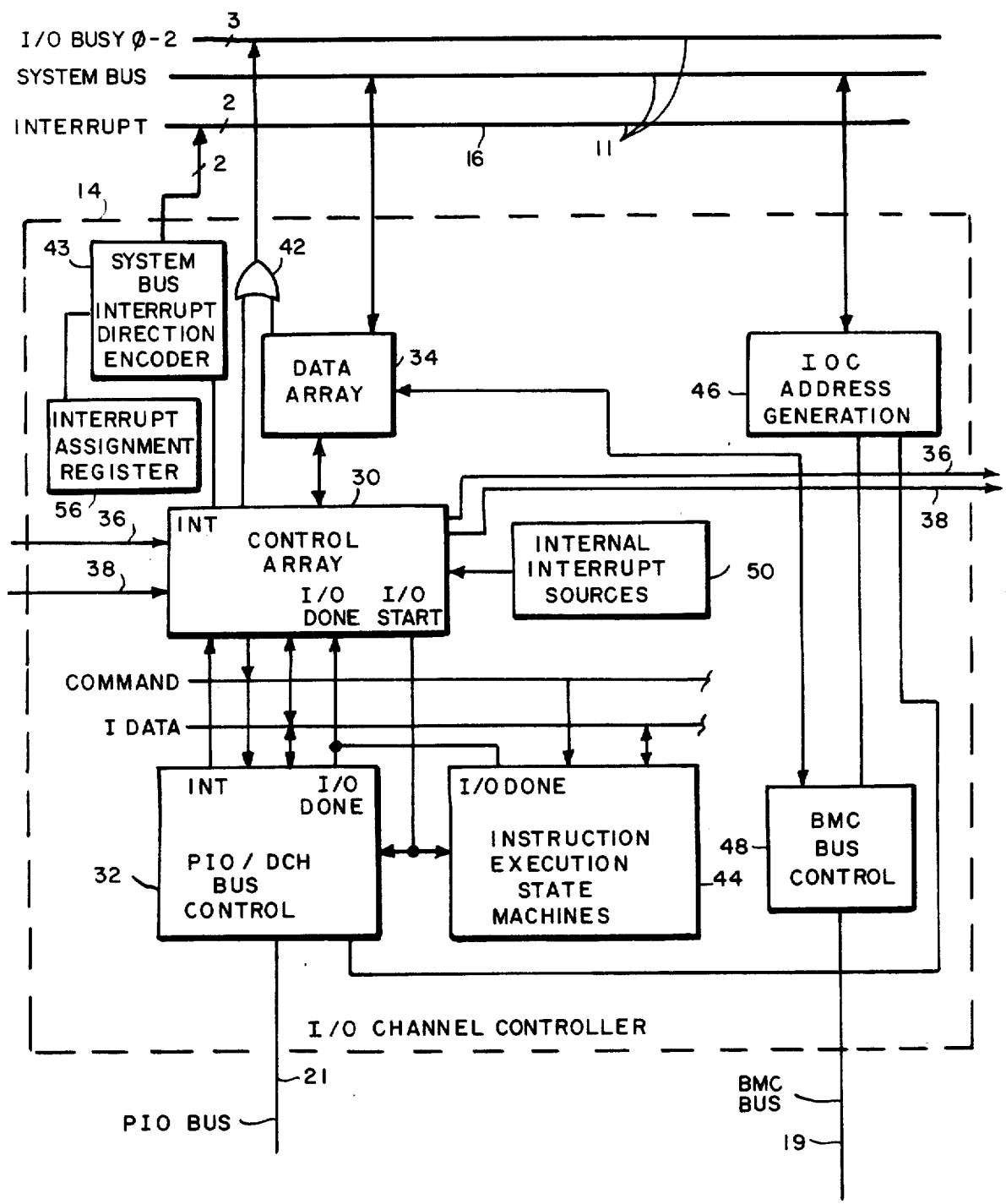
FIG. 2 is a schematic diagram of an input/output channel controller from the system of FIG. 1.

Referring now to FIG. 2, a simplified schematic of an input/output channel controller 14 is provided. Interrupts are received by an I/O channel controller from the PIO bus 21. The interrupts are passed through a PIO/DCH bus control 32 and passed to a control array 30. The control array 30 drives a single bit line which indicates whether an interrupt is pending. The single bit interrupt line is provided to a system bus interrupt direction encoder 43. An interrupt assignment register 56 contains a bit which indicates to which CPU the I/O channel controller is assigned. The encoder 43 directs the interrupt to the interrupt line 16 for the assigned CPU. If a CPU orders a CPU cross interrupt, the assignment is ignored and the interrupt is directed to the CPU identified by the interrupt.

An interrupt may also be supplied to the control array 30 by one of the internal interrupt sources 50. The internal interrupt sources 50 include power failure, clock interrupts, TTY asynchronous I/O communication line interrupts or any other internal interrupts which a particular I/O channel controller is designed to generate.

Information is taken off of the system bus by a data array 34. The system bus includes control, address, command and data lines. The IOBUSY lines and the interrupt lines are control lines which are particularly pertinent to the present invention. An operation is handled on the system bus in two parts, an address phase and a data phase. First, the address and command bits are sent during the address phase over the system bus. At the completion of the address phase, the data phase begins. When the operation on the system bus is addressed to an I/O channel controller, that I/O channel controller will assert its I/O busy line through OR gate 42. The command and data obtained from the system bus is transferred from the data array 34 to the control array 30 where it is processed and placed on the internal command and internal data buses. Depending on the command placed on the command bus line, the instruction will be executed either in the PIO/DCH bus control 32 or the instruction execution state machines 44. IOSTART is a signal issued by the control array to indicate when the bus lines have a valid command for the PIO/DCH bus control 32 or instruction execution state machines 44. Upon completion of an instruction an I/O done signal is generated and provided to the control array 30.

Data at the completion of an instruction is transferred from the internal data bus line to the control array 30 to the data array 34. The data is stored in the data array 34 until it can be placed on the system bus in accordance with the procedures of the system bus protocol. The address for provision to the system bus is generated by IOC address generation block 46. The IOC address generation block receives inputs from the PIO/DCH bus control 32 and a BMC bus control 48. The specific instruction handling and operation of an I/O channel controller does not constitute a part of the present invention except insofar as it relates to the handling of interrupts. The details of an I/O channel controller may be supplied by one skilled in the art.

Priority lines 36 and 38 are shown in FIG. 2 entering the I/O channel controller 14 and passing through control array 30. The priority lines are discussed in greater detail with reference to FIG. 4 below.

In accordance with the present invention, it is possible for a CPU to address one or more I/O channel controllers in the address phase of an operation. An operation which is addressed to all of the I/O channel controllers is called a broadcast instruction. The important aspect of the generation of IOBUSY is that it be accomplished synchronously for all I/O channel controllers when all of them are addressed in a broadcast instruction.

The generation of IOBUSY by the data array 34 and control array 30 will depend largely on the particular protocol being employed on the system bus. One particular system bus protocol is described in a copending patent application sharing the same assignee and filing date as the present application and entitled "Method and Apparatus for Implementing a Bus Protocol". This application is hereby incorporated by reference herein. In accordance with that bus protocol, FREZ, WAIT and BUSINH are control signals which are used to indicate the status of the bus. FREZ is asserted during the address phase. BUSINH is asserted during a double bit error correction and WAIT is asserted during the data phase. If an address of an operation is directed to an I/O channel controller either by itself or in a broadcast instruction, IOBUSY for that I/O channel controller will be asserted at the end of the address phase which coincides with the beginning of the data phase. In the system bus protocol of the copending application this occurs when FREZ and BUSINH are not asserted and WAIT becomes deasserted. IOBUSY is asserted one clock cycle after WAIT becomes deasserted to coincide with the beginning of the data phase and the end of the address phase. The specifics of the system bus protocol are not important to the present invention. It is only necessary to provide the logic means for converting the bus status signals into a signal which can be synchronously generated in each of the I/O channel controllers in response to a broadcast instruction.

The synchronization of the determination of priority is carried on in the I/O control array 30. In the presently preferred embodiment a CTRL IOBZ signal is asserted one clock signal following the assertion of IO BUSY. CTRL IOBZ remains asserted until the I/O control array 30 receives the IODONE signal. CTRL IOBZ is deasserted on the clock following the assertion of IODONE. I/ODATA IOBZ is asserted simultaneously with IOBUSY. Indeed, it is IODATA IOBZ which is fed into OR gate 42 to drive IOBUSY. The other input to OR gate 42 is CTRL IOBZ. IODATA IOBZ becomes deasserted at the end of the data phase. In the bus protocol of the copending application, this is determined to be the clock following the deassertion of WAIT. IOBUSY remains asserted until CTRL IOBZ is deasserted in response to IODONE.

Figure 3:
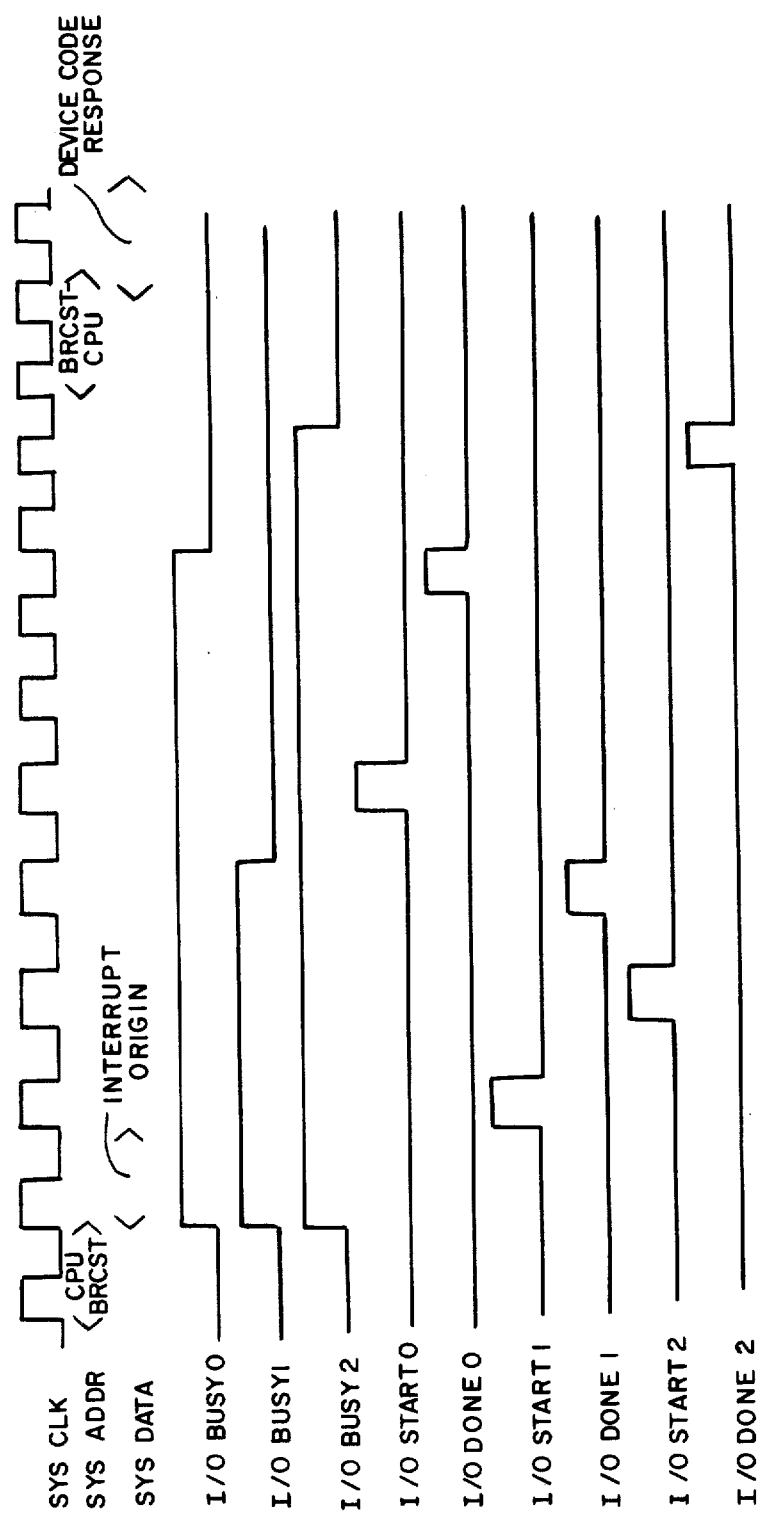
FIG. 3 is a timing diagram of an interrupt handling sequence by the system of FIG. 1.

FIG. 3 is a timing diagram representative of a sequence carried out by a system of the present invention. The illustrated sequence begins with one of the CPUs issuing a broadcast instruction on the system bus. At the completion of the address phase, an interrupt origin request is sent out on the system data lines. Simultaneously with the end of the address phase and beginning of the data phase all of the I/O channel controllers assert their respective I/O busy signals. IOBUSY remains asserted until its respective I/O channel controller receives the IODONE signal. Depending upon whether an I/O channel controller is busy on other instructions each may issue its I/O start signal at different times. The I/O start will be received by the PIO/DCH bus control 32 which issues the interrupt origin request over the PIO bus 21. The executionof an interrupt origin request is known as an INTA in a NOVA/ECLIPSE bus. The response to the interrupt origin request signal will be determined by the control array 30 upon receiving the response from the PIO/DCH bus control 32 and any interrupts which it may be alerted of through internal interrupt sources 50. In addition, the control array considers whether the I/O channel controller has priority before returning a device code to the CPU. The response is stored in the control array 30 until the data array 34 is ready for it. After all of the I/O channel controllers have deasserted IOBUSY, the response may be sent out to the CPU as soon as the system bus protocol allows. All of the I/O channel controllers respond at the same time. This is made possible since the lines are open collector lines which operate as a wired OR and only the I/O channel controller having the highest priority pending interrupt will send out non-zero bits in its device code response.

Figure 4:
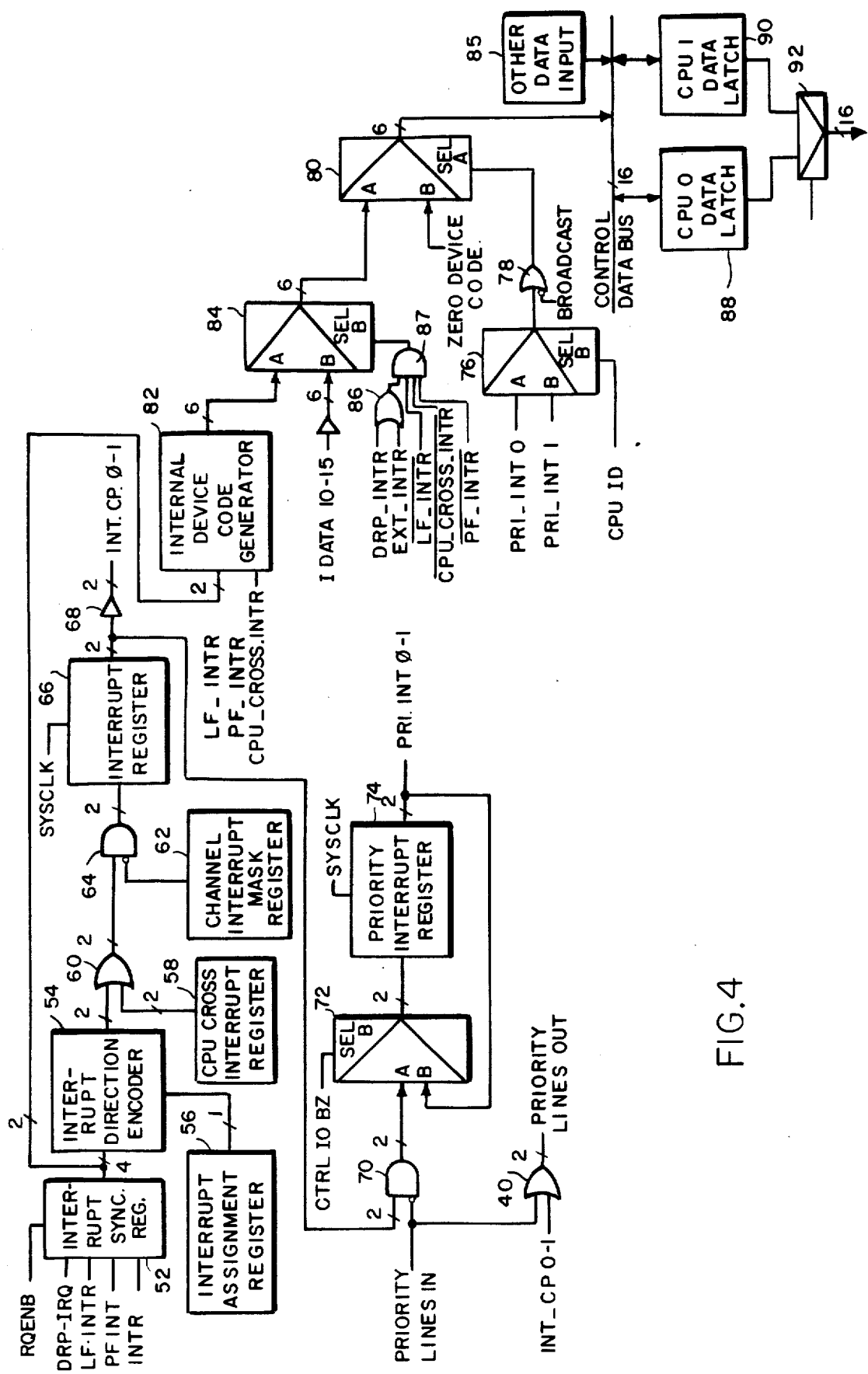
FIG. 4 is a schematic diagram of interrupt handling gates and registers of the input/output channel controller of FIG. 2.

Referring now to FIG. 4, the logic contained in the control array 30 for handling interrupts shall be described. An interrupt SYNC register 52 is clocked by the request enable (RQENB) signal from the NOVA/ECLIPSE ® bus 21. This serves to synchronize the interrupt signals. All interrupts other than a CPU cross interrupt are fed into the interrupt SYNC register 52. If the diagnostic remote processor 22 issues an interrupt, it will be on signal line DRP_IRQ. A line frequency interrupt (LF_INTR) and a power fail interrupt (PF_INTR) are internally generated by the I/O channel controller 14. External interrupts generated by the I/O device controllers are indicated by the signal INTR from the NOVA/ECLIPSE ® bus. The synchronized interrupts are fed into an interrupt direction encoder 54. The interrupt direction encoder ORs the interrupt signals together to determine whether an interrupt is pending. The interrupt assignment register 56 informs the interrupt direction encoder 54 as to which processing unit 12 the I/O channel controller 14 is assigned to. The determination of whether an interrupt is pending is sent along a line associated with the assigned CPU. Two lines are shown at the output of the interrupt direction encoder 54, one for each of the CPUs. FIG. 4 is a block diagram which shows one set of logic gates rather than duplicating the logic which is the same for each CPU. The lines which indicate two bits are a shorthand representation of the lines for each CPU receiving the same treatment.

A CPU cross-interrupt register 58 allows a CPU to issue an interrupt to the other CPU. Register 58 is filled by a CPU which communicated with the register 58 through the system bus. A CPU cross-interrupt register is handled by an I/O channel controller regardless of which CPU it is assigned to through the interrupt assignment register 56. Therefore, an interrupt is pending as determined by OR gate 60 if there is either a CPU cross-interrupt to the particular CPU associated with the signal line or an interrupt assigned to that particular CPU.

It is also possible for a CPU to instruct an I/O channel controller 14 that it does not want to accept any interrupts from that I/O channel controller. This is accomplished by setting the associated bit in a channel interrupt mask register 62. The processing units 12 communicate with interrupt assignment register 56, CPU cross-interrupt register 58 and the channel interrupt mask register 62 through the system bus. Therefore, the operating software can make an assignment of a CPU to each I/O channel controller by ordering the appropriate setting of the interrupt assignment register 56. A CPU can mask all interrupts from a particular I/O channel controller by setting the channel interrupt mask register 62. If register 62 is set, then no interrupts will be indicated to CPU interrupt register 66 through AND gate 64. CPU interrupt register 66 is clocked by the system clock. There is an open collector driver 68 which drives each of the interrupt pending signals (INT_CP0 and INT_CP1). The interrupt pending signal is provided to the priority chain at OR gate 40.

An I/O channel controller 14 has priority for a particular CPU if its priority line associated with that CPU is a low signal. If the priority line is high, the fact that a higher priority I/O channel controller has priority will be passed on through OR gate 40 to all of the lower priority I/O channel controllers. If priority has not been asserted by any higher priority I/O channel controllers, the present I/O channel controller can deny priority to all lower priority I/O channel controllers when an interrupt is pending for a particular CPU as indicated by the interrupt pending signal.

The interrupt pending signal is also input into an AND gate 70. Here it is combined with the incoming priority line. There is an AND gate 70 for each CPU. The output of the AND gate 70 indicates whether the I/O channel controller has priority for that CPU and has an interrupt pending for that CPU. This status regarding priority interrupts is fed into a multiplexor 72. The CTRL IOBZ signal will allow the input from AND gate 70 to feed through the multiplexor while CTRL IOBZ is not asserted. However, when CTRL IOBZ is asserted multiplexor 72 will output the priority interrupt status which was latched in priority interrupt register 74. As long as CTRL IOBZ is asserted, the priority interrupt status will remain the same. This is especially advantageous because the CTRL IOBZ signal is asserted simultaneously in each of the I/O channel controllers when a broadcast instruction is issued by a CPU. As soon as the CTRL IOBZ signal is asserted, each of the I/O channel controllers will know if they have a priority interrupt. This situation will not change throughout the execution of the broadcast interrupt origin request.

The knowledge of whether an I/O channel controller has a priority interrupt is used in responding to a broadcast interrupt origin request. At multiplexor 76 the CPUID, a bit obtained from the system bus which identifies which CPU issued the interrupt origin request, is used to select the appropriate priority interrupt signal. If the request is a broadcast interrupt origin request and the I/O channel controller does not have a priority interrupt for the requesting CPU, then OR gate 78 will send a signal which selects a zero device code to be issued from multiplexor 80.

A device code identifying the particular interrupt is generated in internal device code generator 82 for internal interrupts such as line frequency, power fail, and also in the case of CPU cross-interrupts. External interrupts produce a device code over the PIO bus 21 which is provided to the IDATA bus of the control array. An interrupt from the diagnostic remote processor would also be placed on the IDATA bus. The six bit device code is fed into multiplexor 84. The line frequency, power fail and CPU cross-interrupts have the highest priority. An inverted version of each of these interrupt signals is provided to AND gate 87 so that if one of them is pending multiplexor 84 will select the device code from the internal device code generator 82 to provide to multiplexor 80. An external interrupt signal and a diagnostic remote processor interrupt signal are provided to OR gate 86. If there are no line frequency, power fail or CPU cross-interrupts pending and an external interrupt or a diagnostic remote processor interrupt is pending, multiplexor 84 will provide the device code from the IDATA bus to the multiplexor 80.

Multiplexor 80 provides the selected device code onto a control data bus. The data bus is 16 bits and the remaining bits are provided by other data inputs indicated by block 85. The word containing the device code will be provided to a CPU0 data latch 88 or CPU1 data latch 90 depending on which was the requesting CPU. It is desirable to have a data latch for each CPU so that the data will not be lost if the other CPU accesses the I/O channel controller before all of the I/O channel controllers are done and the response to the interrupt origin request is issued over the system bus. Multiplexor 92 makes the appropriate selection of data from the CPU0 data latch 88 or CPU1 data latch 90 upon request from data array 34. The data array 34 will send the data onto the system bus.

The interrupt handling apparatus and method as described herein enables a dual processor system to determine the highest priority interrupt in all I/O channel controllers with a single instruction. A CPU provides a single broadcast interrupt origin request and receives a single response simultaneously from all of the I/O channel controllers which provides the required information. This single simultaneously driven signal is made possible even though the I/O channel controllers are generally operating asynchronously.

While specific implementations of the interrupt handling method and apparatus are disclosed above for the particular embodiment of the invention, the invention is not limited thereto. Modifications thereof within the spirit and scope of the invention will occur to those in the art. It is therefore intended that such modifications be covered by the following claims.

We claim:

1. A multiprocessor computing system comprising:
a system bus, including an address bus for carrying an address phase of an instruction and a data bus for carrying a data phase of an instruction;
a plurality of processing units connected to said system bus, each processing unit including means for generating broadcast interrupt origin request instructions on said system bus;
a plurality of asynchronous input/output channel controllers connected to said system bus, each of said input/output channel controllers including means for generating a synchronizing signal in response to completion of an address phase of a broadcast instruction on said system bus, and
a plurality of priority lines, each priority line corresponding to a different one of said processing units connected through each of said input/output channel controllers, said input/output channel controllers being arranged on said priority lines in order of priority, said priority lines being gated in an input/output channel controller so that priority is asserted over all lower priority input/output channel controllers on a priority line by an input/output channel controller if said input/output channel controller has an interrupt pending in said input/output channel controller for the processing unit corresponding to said priority line.

2. The multiprocessor computing system of claim 1 wherein each of said input/output channel controllers further includes for each respective processing unit, means, connected to the priority line corresponding to said respective processing unit and connected to receive a signal indicating whether an interrupt is pending for said respective processing unit in the input/output channel controller, for generating a priority interrupt pending signal corresponding to said respective processing unit when said input/output channel controller has priority and an interrupt pending for said respective processing unit and means for latching said priority interrupt pending signal in response to generation of said synchronizing signal.

3. The multiprocessor computing system of claim 2 wherein each of said input/output channel controllers further includes means for generating a device code response to a broadcast interrupt origin request instruction which identifies a highest priority interrupt pending at said input/output channel controller.

4. The multiprocessor computing system of claim 2 wherein said means for latching comprises:
a register for storing a signal; and
a multiplexor for receiving said priority interrupt pending signal and said synchronizing signal and for sending said register said priority interrupt pending signal when said synchronizing signal is not being generated and for feeding back the signal in said register to said register when said synchronizing signal is generated.

5. The multiprocessor computing system of claim 4 wherein each of said input/output channel controllers further includes selection means for selecting said device code response if said priority interrupt pending signal corresponding to a processing unit that generated a broadcast interrupt origin request instruction indicates that said input/output channel controller had priority and a pending interrupt and for selecting a zero response if said priority interrupt pending signal corresponding to the processing unit that generated the broadcast interrupt origin request instruction indicates that said input/output channel controller did not have priority or did not have a pending interrupt.

6. The multiprocessor computing system of claim 5 wherein said input/output controller has a plurality of data latches, each data latch corresponding to a different one of said processing units, for receiving the response selected by said selection means when the processing unit which generated the broadcast interrupt origin request instruction corresponds to said data latch.

7. The multiprocessor computing system of claim 5 wherein each of said input/output channel controllers further includes means, responsive to a signal obtained from said system bus that indicates which processing unit generated the broadcast interrupt origin request instruction, for selecting the priority interrupt pending signal corresponding to the processing unit that generated the broadcast interrupt origin request instruction and for sending said priority interrupt pending signal corresponding to the processing unit that generated the broadcast interrupt origin request to said selection means.

8. The multiprocessor system of claim 5 wherein each of said input/output channel controllers further includes an interrupt assignment register accessible by said processing units through said system bus for containing a signal indicating to which of the processing units said input/output channel controller is assigned.

9. The multiprocessor computing system of claim 5 wherein said input/output channel controller further includes means for generating a done signal when said device code response has been generated, said done signal being used to deassert said synchronizing signal.

10. The multiprocessor computing system of claim 1 wherein said system bus comprises a plurality of open-collector lines.

11. An input/output channel controller for use in a computing system having two processing units and a system bus comprising:
   an interrupt assignment register for storing an identification signal indicating to which of said two processing units said input/output channel controller is assigned;
   two interrupt registers each associated with a different one of said processing units;
   first means for receiving a pending interrupt signal produced in said input/output channel controller or in the input/output channel controlled by said controller and for directing said pending interrupt signal to one of said two interrupt registers selected in accordance with the signal stored in said interrupt assignment register;
   two priority chains each associated with a different one of said processing units and each providing an input signal that indicates whether an interrupt is pending in a higher priority input/output channel controller for its respective associated processing unit;
   second means for generating priority interrupt signals in response to the input signals from said priority chains and said interrupt registers, each priority interrupt signal being generated in response to one of said input signals and an interrupt register both of which are associated with the same one of said two processing units; and
   means, included in each priority chain, for receiving the priority interrupt signal associated with the same processing unit as is associated with said priority chain and for forwarding a signal that indicates whether an interrupt is pending in a higher priority input/output channel controller or in said input/output channel controller for said associated processing unit.

12. The input/output channel controller of claim 11 further comprising means for asserting a synchronizing signal in response to a completion of an address phase on said system bus.

13. The input/output channel controller of claim 12 further comprising third means for latching said priority interrupt signals when said synchronizing signal is asserted.

14. The input/output channel controller of claim 13 wherein said third means comprises a priority interrupt register and a multiplexor which receives a first input from said priority interrupt register, a second input from said second means and a third input comprised of said synchronizing signal, said multiplexor providing to said priority interrupt register said first input when said synchronizing signal is asserted and said second input when said synchronizing signal is deasserted.

15. The input/output channel controller of claim 14 further comprising fourth means for generating a device code response to interrupt origin request instructions received from said system bus.

16. The input/output channel controller of claim 15 further comprising fifth means for selecting and outputting one of said priority interrupt signals from said third means in accordance with which processing unit sent a broadcast interrupt origin request instruction over said system bus; and
   sixth means responsive to a broadcast instruction, for selecting the response generated by said fourth means if said one of said priority interrupt signals output from said fifth means indicates that the input/output channel has priority and a pending interrupt and for selecting a zero response otherwise.

17. The input/output channel controller of claim 16 further comprising sixth means, responsive to said one of said priority interrupt signals output from said fifth means and a broadcast instruction, for selecting the response generated by said fourth means if said one of said priority interrupt signals output from said fifth means indicates that the input/output channel has priority and a pending interrupt and for selecting a zero response otherwise.

18. The input/output channel controller of claim 17 further comprising two data latches, each associated with a different one of said processing units, the response selected by said sixth means being stored in the one of said two data latches which is associated with the processing unit which sent the broadcast instruction.

19. A method for handling interrupts in a multiprocessor computing system including a system bus, a plurality of processing units and a plurality of input/output channel controllers comprising the steps of:
   providing a priority chain for each processing unit through each of said input/output channel controllers in order of priority;
   asserting priority over all lower priority input/output channel controllers over the priority chain corresponding to a processing unit for which an interrupt is pending;
   generating a priority interrupt signal in an input/output channel controller where priority is not being asserted by a higher priority input/output channel controller over the priority chain associated with one of said processing units and an interrupt is pending for said one of said processing units;
   driving a broadcast interrupt origin request instruction from a requesting one of said processing units;
   asserting a synchronizing signal in each of said input/output channel controllers upon completion of an address phase of said broadcast interrupt origin request instruction;
   latching any priority interrupt signals upon assertion of said synchronizing signal;
   executing said interrupt origin request instruction at each input/output channel controller to produce device code responses determined by pending interrupts;
   selecting the device code response in an input/output channel controller if a priority interrupt signal which corresponds to said requesting one of said processing units is latched and indicates that the respective input/output channel controller had priority and a pending interrupt; and selecting a zero response in an input/output channel controller if there is no priority interrupt signal corresponding to said requesting one of said processing units which is latched to indicate priority and a pending interrupt.

20. The method of claim 19 further comprising:

deasserting said synchronizing signal when said input/output channel controller is done executing an instruction.

21. The method of claim 19 further comprising simultaneously driving on the system bus the device code responses and the zero responses which are selected for each input/output channel controller.

* * * * *